US009391669B2

(12) United States Patent
Black

(10) Patent No.: US 9,391,669 B2
(45) Date of Patent: Jul. 12, 2016

(54) COMMUNICATION USING MULTIPLE CONDUCTOR CABLE

(71) Applicant: William C. Black, Chapel Hill, NC (US)

(72) Inventor: William C. Black, Chapel Hill, NC (US)

(73) Assignee: Northern Microdesign, Inc., Chapel Hill, NC (US)

( * ) Notice: Subject to any disclaimer, the term of this patent is extended or adjusted under 35 U.S.C. 154(b) by 283 days.

(21) Appl. No.: 13/935,186

(22) Filed: Jul. 3, 2013

(65) Prior Publication Data

US 2015/0008992 A1    Jan. 8, 2015

(51) Int. Cl.
 H04B 3/56    (2006.01)
 H04B 3/50    (2006.01)
 H04B 1/707   (2011.01)
 H04B 3/54    (2006.01)
(52) U.S. Cl.
 CPC ............... H04B 3/56 (2013.01); H04B 1/707 (2013.01); H04B 3/50 (2013.01); H04B 3/54 (2013.01); *H04B 2203/5458* (2013.01); *H04B 2203/5466* (2013.01); *H04B 2203/5475* (2013.01); *H04B 2203/5483* (2013.01)
(58) Field of Classification Search
 CPC ............ H04B 3/50; H04B 1/707; H04B 3/56; H04B 3/54; H04B 2203/5458; H04B 2203/5466; H04B 2203/5475; H04B 2203/5483
 USPC ................ 333/24 R, 100; 340/12.33, 310.01, 340/310.06, 310.17; 336/175
 See application file for complete search history.

(56) References Cited

U.S. PATENT DOCUMENTS

| 4,016,429 A | * | 4/1977 | Vercellotti | ............... H04B 3/56 307/149 |
| 6,452,482 B1 | * | 9/2002 | Cern | .............................. 375/258 |
| 8,116,714 B2 | | 2/2012 | Black | |
| 2003/0222748 A1 | * | 12/2003 | Cern | ....................... H01F 19/08 336/178 |
| 2012/0320998 A1 | | 12/2012 | Black | |

OTHER PUBLICATIONS http://dictionary.reference.com/clamp, Definition of the word "clamp", Accessed on Jun. 22, 2015.*
Karmis, Michael, "Mine Health and Safety Management", Nov. 1, 2001, Published by Society of Mining, pp. 411-412.*
Binkofski, Johannes "Influence of the properties of magnetic materials on the size and performance of PLC couplers", Power Line Communications and Its Applications, 2005 International Symposium, pp. 281-284, Apr. 6-8, 2005.
Gnapragasam, Steve J. et al. "Detrimental Effects of Capacitance on High-Resistance-Grounded Mine Distribution Systems", IEEE Trans Ind Appl Sep.-Oct. 2006; 42(5):1333-1339.
United States Mine Rescue Association, "Historical Data on Mine Disasters in the United States", http://www.usmra.com/saxsewell/historical.htm, Jul. 24, 2013, 4 pages.

* cited by examiner

*Primary Examiner* — Benny Lee
*Assistant Examiner* — Jorge Salazar, Jr.
(74) *Attorney, Agent, or Firm* — Goodhue, Coleman & Owens, P.C.

(57) ABSTRACT

A method of communication over a composite cable having a plurality of conductors, the method including placing an inductive coupler around the composite cable, coupling the composite cable to a signal input or output using the inductive coupler around the composite cable to communicate a signal to or from the composite cable, wherein the signal is communicated across the composite cable from a first location to a second location, wherein the inductive coupler is at one of the first location and the second location.

23 Claims, 4 Drawing Sheets

COMMUNICATION USING MULTIPLE CONDUCTOR CABLE

FIELD OF THE INVENTION

The present invention relates to communications. More particularly, but not exclusively, the present invention relates to communications across multiple conductor cable.

BACKGROUND OF THE INVENTION

In various situations there is a need for communications where wireless communications is not practical but there is some existing infrastructure such as cables used for other purposes. One example relates to underground mining. Underground mining operations are inherently dangerous for many reasons including the possibilities of miners being exposed to: (1) toxic gas, (2) exposure to fire or explosion related overpressure and (3) rock falls. This is particularly true of underground coal mines as the ore is inherently flammable and it outgases methane, a flammable and potentially explosive gas that is odorless and invisible. There is a long and tragic history of mine accidents resulting usually from methane and coal dust explosions [1,2]. These explosions not only harm miners but frequently destroy key mine infrastructure such as communication devices and associated cabling making a timely mine rescue of injured or endangered miners both difficult and potentially very dangerous. Wireless communication over significant distances in coal mines is generally not possible due to the attenuating effects of the earth and the somewhat conductive coal seams [3].

Power distribution cable is, however, present in all modern underground mines and is inherently very rugged and durable. This cable is usually referred to as 'high line' cable and consists of all three power phases bundled into a single very thick cable that is typically hung from the walls ("ribs") or roof of mines. Modern mines may require a number of such cables that have current capacities of 300 Amps or more and may be designed for 12 kV or more of potential difference between electrical phases. Because of the required current capacity these cables consist of multiple strands of usually 4/0 woven aluminum cables that are inherently resistant to being severed as each is about 0.5" in diameter with another 0.18" of insulation per strand [4]. Indeed, there is no published or available record of these cables ever being severed in a mine explosion or rock-fall although there is personal recollection of such a cable being pulled out of its socketed connection in a mine transformer ("power center") [5].

What is needed are methods, apparatus, and systems for communications which may be used in mines or other applications which do not require the addition of any cabling specifically for communications but can rely on existing power or other cables that may be very rugged and durable.

SUMMARY OF THE INVENTION

Therefore, it is a primary object, feature, or advantage to improve over the state of the art.

It is a further object, feature, or advantage of the present invention to provide for communications over existing cabling and which do not require the addition of any additional communication system cabling.

It is a still further object, feature, or advantage of the present invention to provide for communications where wireless communications is not practical.

It is a further object, feature, or advantage of the present invention to provide for communications in emergency situations such as in mining accidents.

Another object, feature, or advantage of the present invention is to provide for communications during normal operations such as normal mining operations.

Yet another object, feature, or advantage of the present invention is to provide for communications over composite cabling.

It is a further object, feature, or advantage of the present invention to provide for reliable communications.

These and/or other objects, features, or advantages will become apparent from the specification and claims that follow. No single embodiment need provide each or every object, feature, or advantage. The present invention contemplates that different embodiments may have different objects, features, or advantages.

According to one aspect, a method of communication over a composite cable having a plurality of conductors, the method including placing an inductive coupler around the composite cable, coupling the composite cable to a signal input or output using the inductive coupler around the composite cable to communicate a signal to or from the composite cable, wherein the signal is communicated across the composite cable from a first location to a second location, wherein the inductive coupler is at one of the first location and the second location.

According to another aspect, a communication system is provided for communication over a composite cable having a plurality of conductors. The system includes a first inductive coupler, the first inductive coupler comprising an annular body configured for clamping around the composite cable and configured for injecting an RF signal to the composite cable, a second inductive coupler, the second inductive coupler comprising an annular body configured for clamping around the composite cable and configured for receiving the RF signal from the composite cable and wherein the composite cable provides a communication path between the first inductive coupler and the second inductive coupler.

According to yet another aspect, a method of communication over a composite cable including a plurality of conductors is provided. The method includes placing an inductive coupler around the composite cable, providing a signal at a signal output, coupling the composite cable to the signal output at a first location using the inductive coupler around the composite cable to communicate the signal over the composite cable, and receiving the signal at a second location, the second location separated from the first location.

DETAILED DESCRIPTION OF THE PREFERRED EMBODIMENT

The invention relates to communications by coupling of signals to and from a composite cable. In one embodiment, the invention relates to a method of communicating within a mine that does not require the addition of any communication system cabling and is also potentially quite rugged and suitable for use in both normal mine operations and emergencies. This system makes use of a communication channel via the power distribution cable that is present in all modern underground mines and which is inherently very rugged and durable. This cable is usually referred to as 'high line' cable and consists of all three power phases bundled into a single very thick cable that is typically hung from the walls ("ribs") or roof of mines. Modern mines may require a number of such cables that have current capacities of 300 Amps or more and may be designed for 12 kV or more of potential difference between electrical phases. Because of the required current capacity these cables consist of multiple strands of usually 4/0 woven aluminum cables that are inherently resistant to being severed as each is about 0.5" in diameter with another 0.18" of insulation per strand [4]. Indeed, there is no published or available record of these cables ever being severed in a mine explosion or rock-fall although there is personal recollection of such a cable being pulled out of its socketed connection in a mine transformer ("power center") [5].

This system induces and/or senses signals by either of several means: (1) inductive coupling via a clamp-on device placed around the power cable and (2) coupling between cable ground and a local earth connection.

Figure 1:
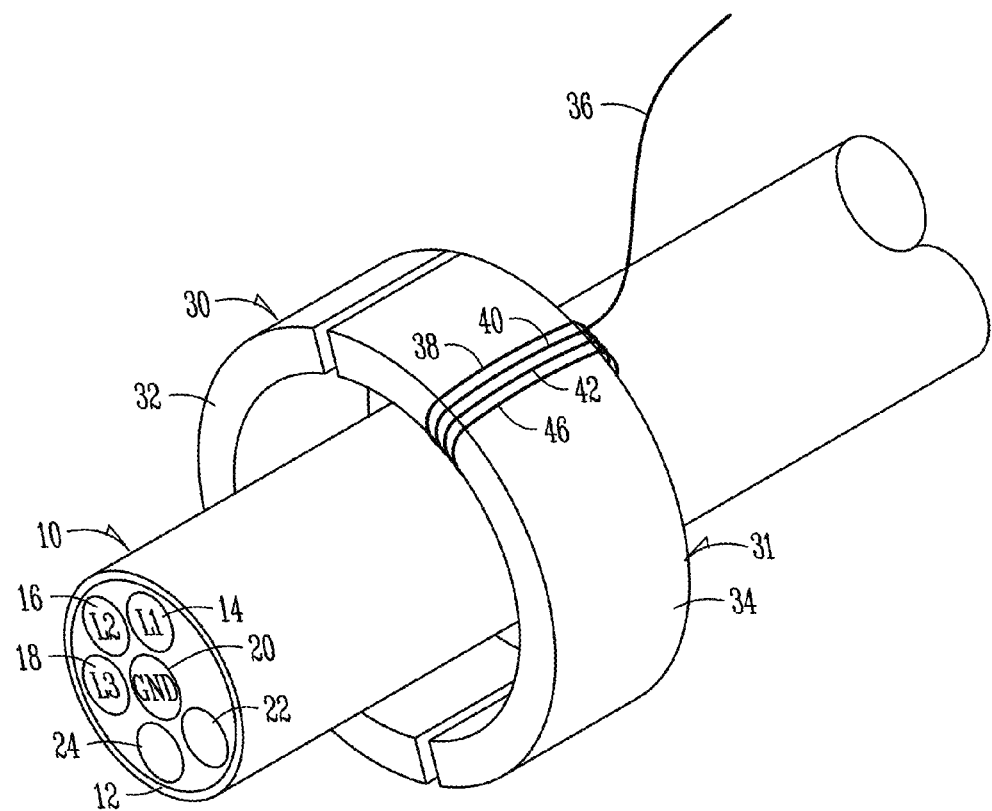
FIG. 1 illustrates a composite cable and an inductive coupler.

FIG. 1 illustrates an inductive coupler over a composite cable. In FIG. 1, there is a composite cable 10 in the form of a composite power cable. The composite cable 10 includes an outer sheath and/or insulator 12 and a plurality of conductors disposed therein. For example, as shown in FIG. 1 there is a L1 conductor 14, an L2 conductor 16, an L3 conductor 18, a ground conductor 20, and additional conductors 22, 24 such as may be used as signaling or sensing lines. The inductive RF coupler 30 is placed around the composite cable 10. The coupler 30 includes wire 36 with one or more loops 38, 40, 42, 44 for coupling RF signals onto or off of the composite power cable 10. The coupler 30 further includes a ring or other annular body 31 which may be formed of a material with a high magnetic permeability that acts as the core of a transformer with the composite power cable 10 as the primary (or secondary) winding and the loops of wire 38, 40, 42, 44 as the secondary (or primary) winding. Here the annular body 31 is formed from a first C-section 32 and a second C-section 34. Note that while the coupler 30 shown in FIG. 1 may be similar to a coupler placed around a single phase cable, here the coupler 30 is placed around the composite cable 10 that includes all three phases and ground as well as optionally other wires used for ground fault or connectivity sensing.

This coupler 30 is schematically similar to a 'residual current device' or 'differential current transformer' [7] commonly used to detect ground faults whereby two or more current carrying wires together act as the primary (or secondary) winding but with usually canceling contributions to the magnetic field in the core except for that due to faults.

Figure 2:
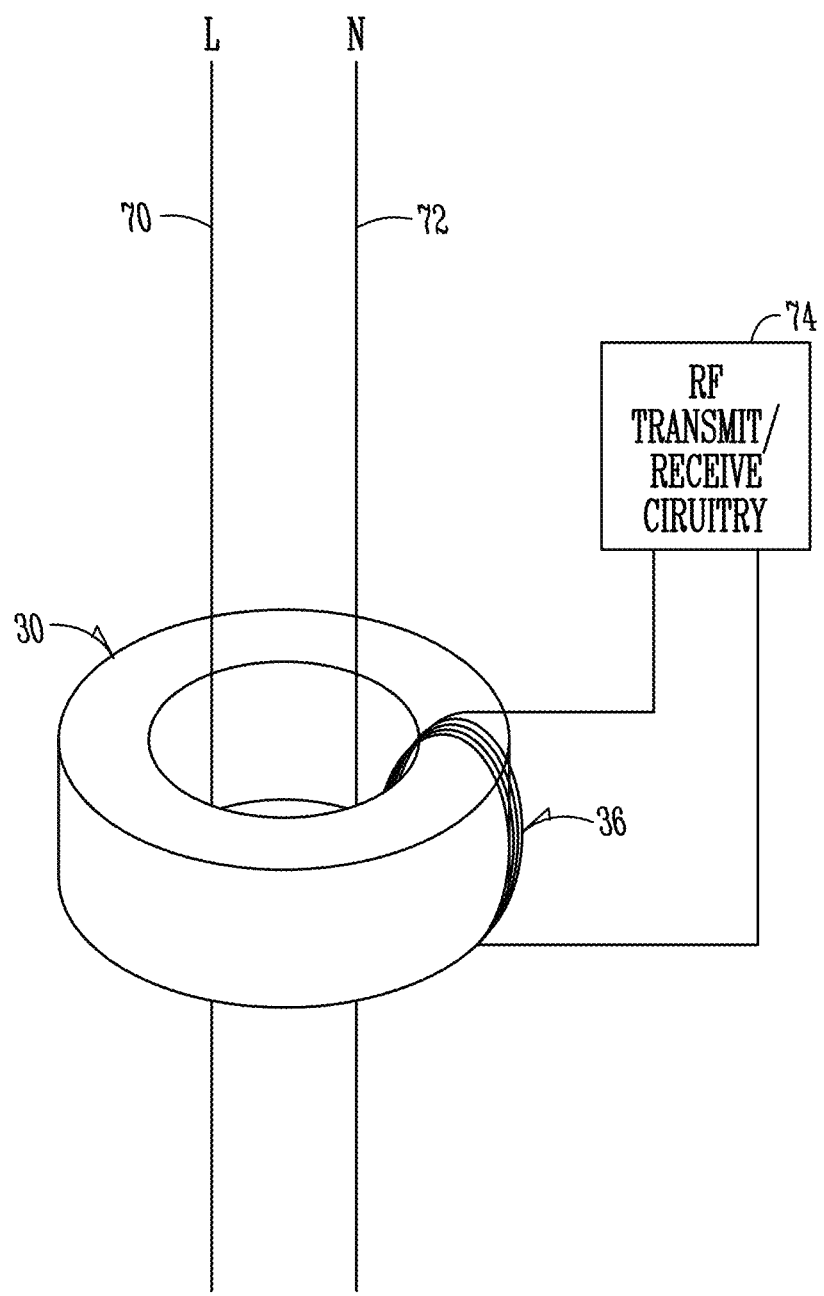
FIG. 2 illustrates a circuit for communications which uses an inductive coupler.

The coupler 30 is further shown in FIG. 2. One or more of the lines (such as lines 70, 72) may carry RF current that may be injected or received by the coupler 30. The RF transmit/receive circuitry 74 provides for RF signal coupling onto and off of the composite power cable, including any other signaling or sensing lines embedded into the cable. The relevant frequency response of the transformer would be that at the employed RF frequencies rather than the AC line frequency.

The transformer core used in the above coupler 30 is an annular body typically in the shape of a ring, toroid or hollow cylinder but may be nearly any closed shape that allows for a closed magnetic path around the primary (or secondary) winding within the high magnetic permeability material. For both single and multiple phase cables it is made of a material with high magnetic permeability such as, but not limited to, ferrite, permalloy or newer nanocrystalline permalloy materials that will allow for adequate coupling between the primary and secondary windings. This latter magnetic material, nanocrystalline permalloy, is typically deposited onto thin plastic films that are then wound into the shape of a ring. The wound rings are more physically durable than ferrite and are usually cut with a diamond saw so that the two C-shaped sections can be configured so as to place around the cable. When the pair of cut halves is placed together into the ring, it is commonly the case that a thin spacer or air gap will be inserted between the C sections that have the effect of reducing the ring's effective permeability and increasing the cable current that will result in magnetic saturation of the ring. This is more important for single phase cables than composite cables with multiple phases as there is cancellation of the magnetic field at the ring for multiple phase systems where the average current of all three phases is near zero at low frequencies in the absence of faults. Realistically there is not perfect cancellation between phases owing to the long cable lengths within a mine but lower fields of at least several times are believed to typically exist for the 3-phase case. Note that not all applications will result in high magnetic field concerns as many applications will have little or no current flow through the ring. For these applications the choice of core material is much wider as saturation of the material at high fields may be unlikely or impossible.

Figure 3:
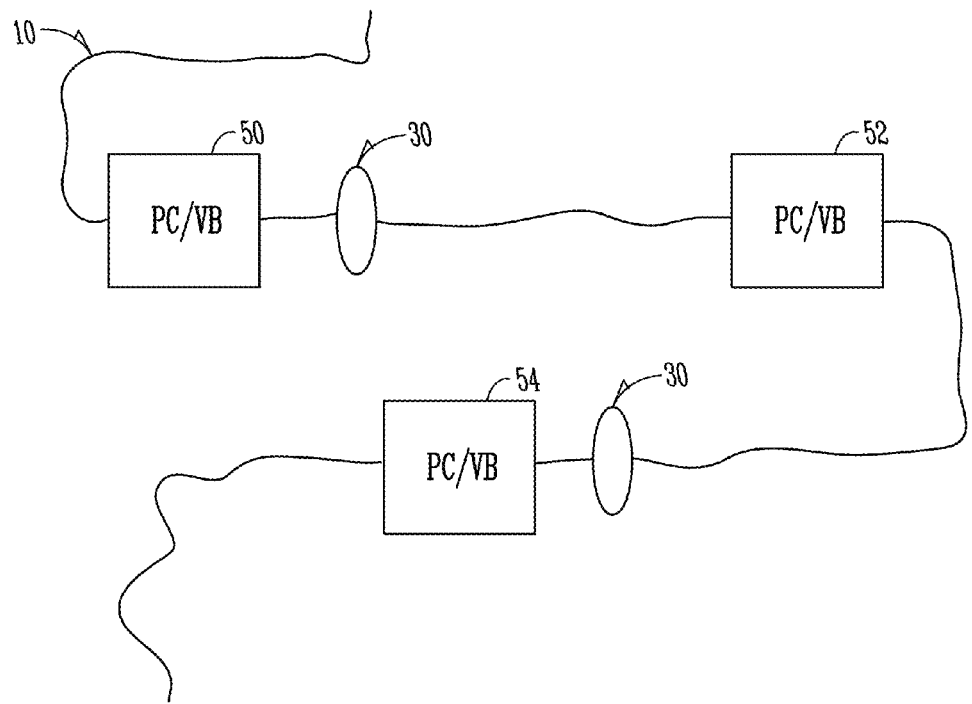
FIG. 3 illustrates a high line such as may be used in a mining operation.

The situation in a mine or other situation whereby the composite cable is used for signaling is shown in FIG. 3. Here the 3-phase distribution cable 10 connects various power centers and vacuum breakers 50, 52, 54 with inductive couplers 30 that are used to inject or receive RF energy from the composite power cable 10. The current return path is actually through the earth for the case of a mine and a simple model is presented in [8]. Note that this same scheme can be used with any composite cable, such as twisted pair or other multi-conductor telecommunication lines, coax cables, DC power cables such as are commonly used in low-voltage lighting or computer centers and any AC or sensor cables. Applying the coupler over all phases in a cable has several advantages including: (1) no "break-out box" or "splice box" or other device need be added to apply the signal to an individual phase wire, (2) the magnetic field is typically much lower at the core for a multiple-phase cable allowing a lower acceptable saturation field of the core magnetic material, (3) because the composite cable also includes a ground connection, signaling is possible even if individual phase connections are open as ground is almost never actually switched in a high voltage vacuum switch.

The first advantage mentioned above is made even more important by the fact that the coupler may be easily installed or removed from the high voltage cable without disrupting power and may be installed almost anywhere along the length of the cable with very little difficulty. Hence, if another instrument or communication device is needed at a remote location it may be clamped on in seconds without disrupting power or in any way altering or damaging the cable. This is particularly important for ad-hoc and emergency situations where the physical location of a necessary communication node may not have been previously considered in power or network planning.

The second advantage, allowing a lower magnetic saturation field of the core material, allows a smaller air gap to be used between the pair of 'C-section' halves. This generally means that the core can be designed to have less signal loss or possibly be designed with less exotic materials such as conventional ferrites.

The third advantage, including the ground line as a common-mode signal path along with the other phase wires, means that signaling can occur even with just the ground wire and can include an earth return path. Vacuum breakers and power center switches usually do not switch the ground connections so signaling can occur even through 'open' switches. Because the distribution cable is usually terminated at power centers or vacuum breakers placed on the mine floor that have enclosures tied to the cable ground, there is some earth return current at every such termination. As there is also significant capacitive coupling between the potentially miles long cable and earth, there is also inevitably some earth displacement current. These two factors together generally result in signal current being induced into the high line cable from the coupler although this signal will be attenuated with each power center or vacuum breaker that is leaking to ground and distance along the cable. 'T' type connections that branch the high line cable into multiple branches will also attenuate the signal although the transmitted signal will then be available on these different branches. Another advantage of using the ground node for communication is that it is invariably connected to any outer-most shield of a high voltage cable and hence the cable will act as an antenna for this signal. This allows wireless transport of the signal to and from the cable to communication equipment that is either stationary or mobile. Also, the signal properties of a signal received via the high line cable may be used to ascertain the approximate position of equipment or to calibrate the location finding process by evaluating signals originating from a source in a known position.

Figure 4:
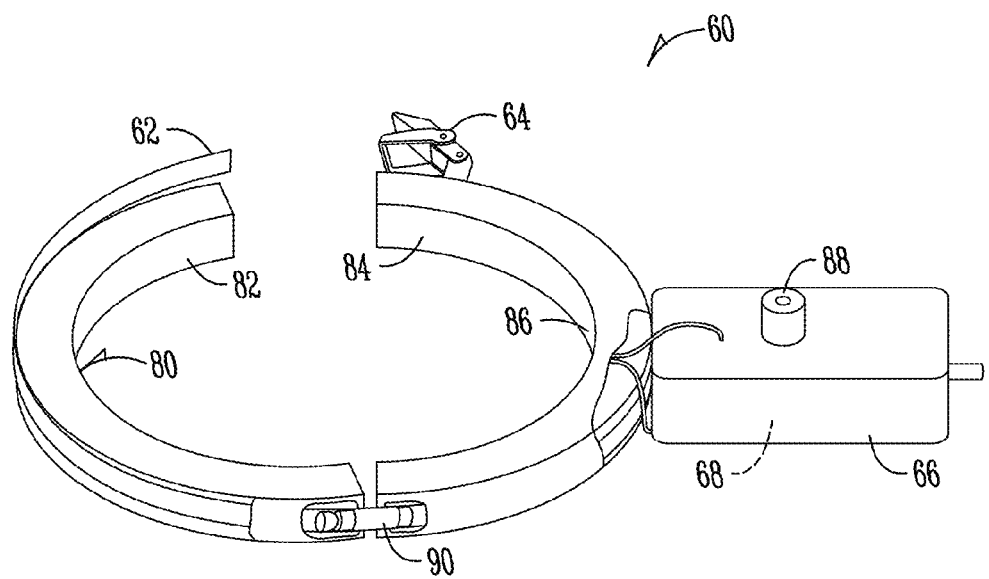
FIG. 4 illustrates a clamp-on inductive coupler.

Another example of a clamp on coupler 60 is shown in FIG. 4 where the coupler 60 may include the following features: (1) quick clamp and unclamp feature that does not require use of any tool and can be attached or removed with high voltage gloves, (2) attached surge protection circuitry that also serves as a handle, (3) optional loop connector that allows simple measurement of RF loop inductance in the field, (4) high voltage insulation on the inner surface of the annular body and (5) clamp pressure adjustment.

As shown in FIG. 4, the coupler 60 is formed from the annular body 80 which has a first section 82 and a second section 84. When the coupler 60 is in a fully clamped position, the first section 82 and the second section 84 align although there may be a gap between the sections 82, 84. A band 62 may be inserted into a clasp 64 to quickly clamp the coupler 60 onto a cable without requiring any tool. Similarly, the coupler 60 may be removed from the cable by unclasping the clasp 64 to quickly unclamp the coupler 60 without use of any tool. Where the coupler 60 is used on cables that carry high voltages, an individual may wear high voltage gloves. The band 62 may be a clamp band with a clamp pressure adjustment feature 90 to adjust clamp pressure.

There is also a handle 66 which houses surge protection circuitry 68. An optional loop connector 88 is shown attached to the housing 66. The loop connector 88 allows simple measurement of RF loop inductance in the field. Also as shown in FIG. 4, there is high voltage insulation 86 on an inner surface of the annular body 80.

Although a particular design is shown in FIG. 4, numerous variations in the appearance and structure of the coupler are contemplated.

For communications, nearly any modulation scheme may be used, although the frequency response of the composite cable over the earth will ultimately limit bandwidth performance [8]. Ideally, the frequency response of the inductive couplers should match or exceed that of the cable with earth return so as to minimize transmission losses. One type of modulation scheme which has been used is direct sequence spread spectrum (DSSS) as it is inherently resistant to interference and communication systems with earth return are subject to interference and noise from many types of external sources.

In addition to the methods and apparatus previously described, the present invention contemplates that in certain environments such as mining environments, coupling may be otherwise performed. In one embodiment, there may be coupling between cable ground and local earth ground. This situation is only possible where the cable ground is physically accessible such as at mine power centers or vacuum breakers. It is normally the case with this equipment that the cable ground is electrically connected to the metal case of the equipment and to the ground and neutral connections of any 120 VAC power outlets on the equipment. Connection to local earth ground can be made by attaching to a nearby roof bolt or mesh of roof bolts or by placing a roof bolt into the mine floor specifically for use as a ground connection. At low frequencies it is probably better to not use an epoxy bolt or use a modified epoxy that is actually conductive. Applying a potential or current between the cable ground and local earth ground will couple a signal onto the power cable. Incoming current present on the cable ground will also be observable relative to the local earth ground and can be received at this location. Another variation on this scheme is to couple between the cable ground and the outside of the case that is usually at least somewhat coupled to ground by placement of the equipment on the mine floor. This could be accomplished, for example, by placing the wire or cable connecting the cable ground to the equipment case through an inductive coupler as shown previously. This method shares the third advantages mentioned above for the inductive coupling in that ground connections are generally NOT switched at vacuum breakers and hence are always connected once the cable is attached.

This method is a form of a single-wire earth return communication system [9] but where the cable is a composite of multiple-conductors.

In addition to the methods and apparatus previously described, the present invention contemplates that in certain environments such as mining environments communication may occur through wireless coupling between an antenna and the power cable. This coupling method uses an antenna that can be either portable or stationary to transmit onto the power cable or receive a signal from the power cable, or both [10]. It has the clear advantage of not requiring placement on or around the cable or an attached device such as a power center or vacuum breaker and characteristics of the signal received at different points along the power line can be used to, for example, estimate the position of a wireless and possibly mobile transmitter. Similarly, by transmitting a signal from multiple locations onto the power line, the wireless signals received at a potentially mobile receiver can be used to infer approximate position. [11].

Various different implementations of these methods are particularly useful in the mine environment that may be used individually or collectively. These include infrastructure use with repeaters, use with at least one mobile node, and location tracking.

Infrastructure Use with Repeaters

In this arrangement, communication nodes are placed at intervals along the power cable or within the power centers or vacuum breakers such that communication between adjacent nodes is assured and where each node provides message relay capability for messages originating from or going to other nodes. Note that the communication nodes need not exclusively use the power line but may pass data to and from other communication channels, such as fiber optic cables, coax etc. but where at least part of the overall signal path is over the power cable. Also, the power cable in this case can be either high line or even trailing cable used to power mobile mining machines and other equipment. It is anticipated that communication with relatively distant nodes would be via an inductive coupler but coupling between the local ground node on a power center or vacuum breaker and local earth is also possible as is wireless coupling onto or off of the power cable.

Use with at Least One Mobile Node

In this arrangement, communication will be at least periodically maintained with a mobile communication device that is mounted on equipment or mine personnel. The mobile device may either be within range of the power cable for wireless communication or use an inductive coupler that can be easily clamped around the power cable as required. In the simplest case, such as would be useful for a mine rescue situation, a pair of mobile devices might be used where one device would be used by a team in a relatively safe location closer to the surface and the other carried by an advance team into the areas of the mine that are perceived as likely being dangerous. If appropriate, the advance team could even install repeaters along the power cable to extend the range of communication between the two teams. Thus, mobile communication devices may communicate with couplers which are coupled to composite cables.

Location Tracking

In this arrangement, signal characteristics will be analyzed so as to either ascertain approximate relative locations between units or so as to calibrate the locating process. Several algorithms are useful for this purpose including time of arrival, relative time of flight and relative signal strength between locations. Moreover, beacons may be placed at known locations within the mine to assist in calibrating the locating process. The choice of algorithm will to some degree depend upon the stability and consistency of timing sources available for use in the mobile units as any drift that is not predicted will add errors to location estimation from simple time of arrival measurements but will be at least somewhat compensated for by measuring relative arrival time from two or more known locations within the mine. Thus, determining location from signal characteristics from communications over a composite cable may be performed.

Variations, Options, and Alternatives

Various embodiments of methods, apparatus, and systems for communications have been described. Numerous variations, options, and alternatives are contemplated, including variations in the type of cable used, variations in the specific environment in which the communications are performed, variations in the structure and configuration of the coupler. It is also to be understood that a cable is merely one form of conduit which may be used and other types of conduits may be used. It is to be further understood that a coupler may be used to transmit, receive, or both as may be appropriate in a unidirectional or bi-directional system and that in various systems an inductive coupler need not be used as a transmitter. It is to be still further understood that there may be wireless coupling to and/or from a cable at one station and an inductive coupler may be present at another station.

REFERENCES

The below references have been cited throughout. Each of the published references below are hereby incorporated herein as if set forth in this specification.

[1] United States Mine Rescue Association web site (usmra.com).
[2] Wikipedia web site (wikipedia.org), "Mining accident."
[3] Office of Mine Safety and Health Research of the Center for Disease Control and Prevention (cdc.gov), "Basic Tutorial on Wireless Communication and Electronic Tracking: Technology Overview."
[4] J. Sottile, S. Gnapragasam, T. Novak and J. Kohler, "Detrimental effects of capacitance on high-resistance-grounded mine distribution systems", *IEEE Trans Ind Appl* 2006 September-October; 42(5): 1333-1339.
[5] D. P. Snyder, personal communication (18 Mar. 2010).
[6] J. Binkofski, "Influence of the properties of magnetic materials on the size and performance of PLC couplers", *Power Line Communications and Its Applications*, 2005 International Symposium, vol., no., pp. 281,284, 6-8 Apr. 2005.
[7] Wikipedia web site (wikipedia.org), "Residual current device."
[8] Jingcheng Li; Whisner, B.; Waynert, J. A., "Measurements of medium frequency propagation characteristics of a transmission line in an underground coal mine," Industry Applications Society Annual Meeting (IAS), 2012 IEEE-, vol., no., pp. 1,8, 7-11 Oct. 2012.
[9] Wikipedia web site (wikipedia.org), "Single-wire earth return."
[10] U.S. Pat. No. 8,116,714.
[11] U.S. Published Patent Application No. 2012-0320998.

What is claimed is:

1. A method of communication over a composite cable comprising a plurality of conductors extending from a first location to a second location using a clamp-on inductive coupler around all of the plurality of conductors of the composite cable, the method comprising:
    coupling the composite cable to a signal input or output using the clamp-on inductive coupler around all of the plurality of conductors of the composite cable to communicate a signal to or from the composite cable;
    communicating the signal along the composite cable from the first location to the second location;
    wherein the clamp-on inductive coupler is at one of the first location and the second location;
    wherein the composite cable comprises a sheath around the plurality of conductors and wherein the clamp-on inductive coupler is clamped in place around the sheath.

2. The method of claim 1 wherein the composite cable comprises three phase conductors and a ground conductor.

3. The method of claim 1 further comprising wirelessly communicating the signal from the second location to a third location.

4. The method of claim 1 further comprising determining a position of the first location from signal characteristics of the signal as received at the second location.

5. The method of claim 1 further comprising removing the clamp-on inductive coupler from around the composite cable.

6. The method of claim 1 further comprising wirelessly communicating to and/or from the composite cable.

7. The method of claim 1 wherein the signal is a spread-spectrum signal.

8. The method of claim 7 wherein the spread-spectrum signal is a direct-sequence spread spectrum (DSSS) modulation scheme signal.

9. The method of claim 1 wherein at least one of the first location and the second location is underground.

10. The method of claim 9 wherein at least one of the first location and the second location is underground within a mine.

11. The method of claim 10 wherein the composite cable is a high line cable or trailing cable comprising three phase conductors and a ground conductor.

12. The method of claim 1 wherein the composite cable comprises multi-conductor telecommunication lines.

13. The method of claim 1 wherein the composite cable comprises DC power cables.

14. The method of claim 1 wherein the composite cable comprises AC or sensor cables.

15. The method of claim 1 wherein the composite cable comprises coaxial cables.

16. The method of claim 1 wherein, the clamp-on inductive coupler comprises (a) an annular body configured to be clamped around the composite cable, the annular body formed from two C-sections, (b) surge protection circuitry, and (c) high voltage insulation on an inner surface of the annular body.

17. The method of claim 16 wherein the clamp-on inductive coupler further comprises a clamp pressure adjustment.

18. The method of claim 1 wherein the signal is an RF signal.

19. A method of communication over a composite cable comprising a plurality of conductors extending from a first location to a second location using a clamp-on inductive coupler around all of the plurality of conductors of the composite cable, the method comprising:
   coupling the composite cable to a signal input or output using the clamp-on inductive coupler around all of the plurality of conductors of the composite cable to communicate a signal to or from the composite cable;
   communicating the signal along the composite cable from the first location to the second location;
   wherein the clamp-on inductive coupler is at one of the first location and the second location;
   wherein the composite cable comprises three phase conductors and a ground conductor.

20. A method of communication over a composite cable comprising a plurality of conductors extending from a first location to a second location using a clamp-on inductive coupler around all of the plurality of conductors of the composite cable, the method comprising:
   coupling the composite cable to a signal input or output using the clamp-on inductive coupler around all of the plurality of conductors of the composite cable to communicate a signal to or from the composite cable;
   communicating the signal along the composite cable from the first location to the second location;
   wherein the clamp-on inductive coupler comprises (a) an annular body configured to be clamped around the composite cable, the annular body formed from two C-sections, (b) surge protection circuitry, and (c) high voltage insulation on an inner surface of the annular body.

21. A method of communication over a composite cable comprising a plurality of conductors extending from a first location to a second location using a clamp-on inductive coupler around all of the plurality of conductors of the composite cable, the method comprising:
   coupling the composite cable to a signal input or output using the clamp-on inductive coupler around all of the plurality of conductors of the composite cable to communicate a signal to or from the composite cable;
   communicating the signal across the composite cable from the first location to the second location;
   wirelessly communicating the signal from the second location to a third location;
   wherein the clamp-on inductive coupler is at one of the first location and the second location.

22. A communication system for communication over a composite cable comprising a plurality of conductors, the system comprising:
   a first inductive coupler, the first clamp-on inductive coupler comprising an annular body configured to be clamped around the composite cable and configured for injecting an RF signal to the composite cable;
   a second clamp-on inductive coupler, the second inductive coupler comprising an annular body configured to be clamped around the composite cable and configured for receiving the RF signal from the composite cable;
   wherein the composite cable provides a communication path between the first clamp-on inductive coupler and the second clamp-on inductive coupler;
   wherein each of the first clamp-on inductive coupler and the second clamp-on inductive coupler comprises (a) surge protection circuitry, (b) high voltage insulation on an inner surface of the annular body, and (c) wherein the annular body is formed from two C-sections.

23. The communication system of claim 22 wherein each of the first clamp-on inductive coupler and the second clamp-on inductive coupler is configured for both injecting and receiving the RF signals.

* * * * *